(12) United States Patent
Shepherd et al.

(10) Patent No.: US 8,848,709 B2
(45) Date of Patent: Sep. 30, 2014

(54) SOURCE ROOTED MULTICAST (SRM)

(75) Inventors: Gregory J. Shepherd, Eugene, OR (US); Dino Farinacci, San Jose, CA (US); Jeff Byzek, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 13/533,863

(22) Filed: Jun. 26, 2012

(65) Prior Publication Data

US 2013/0343384 A1    Dec. 26, 2013

(51) Int. Cl.
*H04L 12/28* (2006.01)
*H04J 3/26* (2006.01)

(52) U.S. Cl.
USPC .......................................... 370/390; 370/432

(58) Field of Classification Search
USPC .................... 370/390, 392, 400, 432
See application file for complete search history.

(56) References Cited

U.S. PATENT DOCUMENTS

| | | | |
|---|---|---|---|
| 7,684,316 B2 | 3/2010 | Filsfils et al. | |
| 7,768,913 B1 | 8/2010 | Shepherd et al. | |
| 7,860,093 B2 | 12/2010 | Shepherd et al. | |
| 8,018,964 B2 | 9/2011 | Eckert et al. | |
| 2006/0187950 A1* | 8/2006 | Bou-Diab et al. | 370/432 |
| 2009/0180400 A1* | 7/2009 | Chiabaut et al. | 370/255 |
| 2010/0284309 A1* | 11/2010 | Allan et al. | 370/256 |
| 2011/0168155 A1* | 7/2011 | Gallo | 126/25 AA |
| 2012/0188909 A1* | 7/2012 | Previdi et al. | 370/254 |
| 2012/0218998 A1* | 8/2012 | Sarikaya | 370/390 |
| 2012/0250685 A1* | 10/2012 | Bisdikian | 370/390 |
| 2013/0064074 A1* | 3/2013 | Chiabaut et al. | 370/225 |
| 2013/0088951 A1* | 4/2013 | Liu | 370/216 |

OTHER PUBLICATIONS

S. Bhattacharyya: "An Overview of Source-Specific Multicast (SSM)", Network Working Group, Request for Comments : 3569; Jul. 2003, pp. 1-15.
Cisco Systems: "Source Specific Multicast (SSM) Homepage" Cisco IOS Software, Apr. 5, 2012; from Internet: <<http://ftp.ipsyn.net/pub/mirrorsicisco/ftpeng.cisco.com/ipmulticast/ssm/>>, pp. 1-6.

* cited by examiner

*Primary Examiner* — Andrew Lee
(74) *Attorney, Agent, or Firm* — Patterson + Sheridan, LLP

(57) ABSTRACT

Methods and apparatus for source rooted multicast (SRM) are provided. As defined herein, SRM generally refers to associating outgoing interface lists (OILs) in the forwarding entry with the source address instead of the group address and aggregating the resulting multicast forwarding states. In this manner, the amount of forwarding state may be reduced, especially in deployments where many hosts are all running the same application and using the same group. One example method generally includes—for each of a plurality of multicast forwarding states associated with a multicast group, wherein each multicast forwarding state is referenced by a source address representing a multicast source and is associated with an outgoing interface list—associating the outgoing interface list with the source address; and aggregating the two or more of the multicast forwarding states having the outgoing interface lists associated with the source addresses to form one or more aggregated forwarding states.

20 Claims, 3 Drawing Sheets

SOURCE ROOTED MULTICAST (SRM)

TECHNICAL FIELD

Embodiments of the present disclosure generally relate to network communications and, more particularly, to multicast data transmissions with aggregated multicast forwarding states.

BACKGROUND

In network communications, the term "multicast" generally refers to transmitting data to multiple receivers simultaneously using a single transmission stream from a source. Multicast may be contrasted with unicast, which involves transmitting data to the multiple receivers using separate transmission streams from the source for each receiver. Multicast is also distinct from broadcast, which entails transmitting data to every node within reach on the network, rather than to a list of specific nodes, as in multicast.

By sending only a single transmission stream intended for multiple receivers (e.g., using a multicast address for addressing a group of receivers), multicast conserves bandwidth compared to unicast. Thus, multicast is often used in streaming media applications, such as Internet television or streaming digital audio, as well as in a variety of other Internet Protocol (IP) applications.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Figure 1:
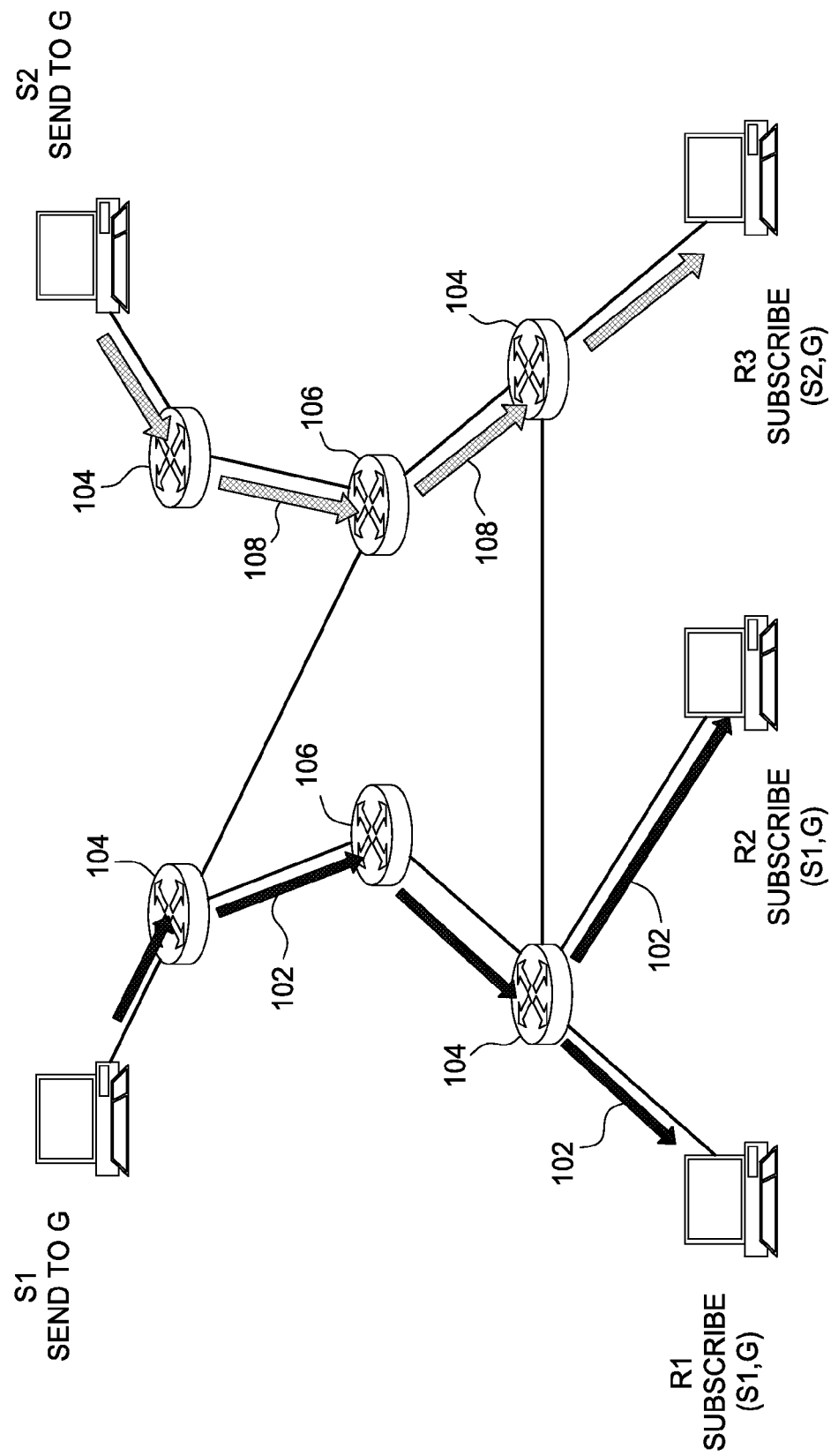
FIG. 1 illustrates an example of source-specific multicast (SSM) traffic delivery, in accordance with an embodiment of the present disclosure.

Embodiments of the present disclosure generally relate to source-rooted multicast (SRM). As defined herein, SRM generally refers to associating outgoing interface lists (OILs) in the forwarding entry of a network element with the source address instead of the group address, such that the multicast forwarding states may be aggregated. In this manner, the amount of forwarding state may be reduced, especially in deployments where many hosts are all running the same application and using the same multicast group.

One embodiment presented herein provides a method for network communications. The method generally includes, for each of a plurality of multicast forwarding states associated with a multicast group, associating an outgoing interface list (OIL) with a source address. Note that each multicast forwarding state may be referenced by a multicast source address and may be associated with an outgoing interface list. This method may also include aggregating two or more of the multicast forwarding states having the outgoing interface lists associated with the source addresses to form one or more aggregated forwarding states. In this manner, the number of aggregated forwarding states may most likely be less than or equal to the number of multicast forwarding states, thereby reducing forwarding state (i.e., decreasing the number of forwarding state entries being stored).

Another embodiment presented herein provides an apparatus. The apparatus generally includes at least one processing unit. The at least one processing unit is typically configured to associate—for each of a plurality of multicast forwarding states associated with a multicast group, wherein each multicast forwarding state is referenced by a multicast source address and is associated with an outgoing interface list—the outgoing interface list with the source address; and to aggregate two or more of the multicast forwarding states having the outgoing interface lists associated with the source addresses to form one or more aggregated forwarding states.

Yet another embodiment presented herein provides an apparatus. The apparatus generally includes means for associating—for each of a plurality of multicast forwarding states associated with a multicast group, wherein each multicast forwarding state is referenced by a source address representing a multicast source and is associated with an outgoing interface list—the outgoing interface list with the source address; and means for aggregating two or more of the multicast forwarding states having the outgoing interface lists associated with the source addresses to form one or more aggregated forwarding states.

Example Embodiments

Embodiments described herein operate in the context of a data communication network including multiple network elements (also referred to as nodes). Some of the elements in a network that employs the embodiments may be routers, switches, gateways, or other network devices. For example, some nodes may be specially configured routers such as those available from Cisco Systems, Inc. of San Jose, Calif. As used herein the term "router" generally refers to devices that forward packets based on network and higher layer information, according to the Open Systems Interconnection (OSI) model. The router may include, for example, a master central processing unit (CPU), interfaces, and a bus (e.g., a PCI bus). When acting under the control of appropriate software or firmware, the CPU is responsible for such router tasks as routing table computations, network management, and general processing of packets. The CPU typically accomplishes all of these functions under the control of software including an operating system and any appropriate applications software. Note that while principally described herein using a router as a reference example, embodiments of the invention are readily adapted with other network devices mentioned above.

With multicast, a receiver expresses interest in receiving packets sent to a specific multicast address (also called a "multicast group address" or simply "group," for short). The receiver is a host and may also be referred to as a listener or a group member. Receivers interested in receiving data flowing to a particular group may join that group using any of various suitable protocols (e.g., Internet Group Management Protocol (IGMP) or Multicast Listener Discovery (MLD)). A multicast source (e.g., a server) sends packets with the destination Internet Protocol (IP) address set to a particular multicast group address. A source need not be a member of the group; sourcing and receiving are mutually exclusive.

Because there may be multiple receivers, the path that multicast packets travel often has numerous branches. Accordingly, a multicast data path is typically referred to as a distribution tree. Data flow through the distribution trees is sometimes referenced in terms of upstream and downstream. The term "downstream" generally refers to the data flow of packets being forwarded by the network nodes toward the receivers, and "upstream" generally refers to the data flow of packets being forwarded by the network nodes toward the source (i.e., towards a multicast sender). A downstream interface may also be called an outbound or outgoing interface. Similarly, an upstream interface may also be referred to as an inbound or incoming interface.

Each router creates, stores, and maintains the incoming and outgoing interfaces for each multicast group, which is generally referred to as the multicast forwarding state and stored as multicast forwarding entries. The multicast forwarding entries may be stored in a certain routing table of the router, which may be referred to as a multicast forwarding table. The incoming interface for a particular group may be referred to as the IIF for that group. The IIF for a multicast forwarding entry may be determined by performing a reverse path forwarding (RPF) lookup in a unicast routing table of the router. The outgoing interfaces may be maintained in a list for a given group and may be referred to as the outgoing interface list (OIL) or "olist" for that group. The OIL may contain 0 to N interfaces, where N is the total number of logical interfaces on the router.

Multicast forwarding state is typically referenced in terms of "(S,G)" and "(*,G)" state, with the router creating, altering, and deleting (S,G) forwarding entries as the network changes (e.g., a receiver is added or removed from a multicast group). In (S,G) notation, the "S" represents the source's unicast IP address. The IP header of a multicast data packet includes S as the packet's source address. The "G" refers to the particular multicast group address involved. The IP header of the multicast data packet contains G as the packet's destination address. In (*,G) notation, the asterisk (*) is a wild card used to denote the multicast forwarding state that applies to any multicast source sending to multicast group G. A single multicast group may have more than one source.

Source-specific multicast (SSM) is a method of transmitting multicast packets in which the only packets delivered to a receiver are those originating from a specific source address requested by that receiver. In addition to the receiver expressing interest in traffic sent to a multicast address, the receiver expresses interest in receiving traffic from only one specific source sending to that multicast address. In SSM, the receiver always specifies the source address, so the use of the (*,G) join is explicitly excluded as a valid multicast forwarding state for all SSM multicast groups. This relieves the network from having to discover many multicast sources and reduces the amount of multicast routing information that the network maintains. Consequently, SSM decreases demands on the network and may increase security.

FIG. 1 illustrates an example of source-specific multicast (SSM) traffic delivery, in accordance with an embodiment of the present disclosure. In FIG. 1, sources S1 and S2 both send multicast traffic to group G. Receivers R1 and R2 have previously requested source S1 in subscribing to group G, such that receivers R1 and R2 will receive multicast traffic intended for group G from source S1. Alternatively, receiver R3 has previously requested source S2 in subscribing to group G, such that receiver R3 will receive multicast traffic intended for group G from source S2 (instead of from source S1). Therefore, the multicast data 102 from source S1 is forwarded through the edge routers 104 and core routers 106 to the receivers R1 and R2. Even though there is a path for receiver R3 to receive multicast data from source S1, receiver R3 has requested to receive multicast data from source S2, such that the multicast data 108 from source S2 is forwarded through the network to the receiver R3.

Example Source-Rooted Multicast (SRM)

Consider a scenario where all the receivers (hosts) are executing the same application, all using the same multicast group. Furthermore, assume that this multicast group uses source-based trees only, in which a separate multicast distribution tree is built for each multicast source sending data to a multicast group. Source-based trees enable the use of Source-Specific Multicast (SSM), which allows receivers to specify the source from which they wish to receive data, as well as the multicast group these receivers wish to join. In a massively deployed application, the amount of multicast forwarding state in any core node (e.g., core router) approaches the number of multicast sources. This is because the number of sources desired may be increased in an effort to support a massively deployed application, while the number of groups need not increase. This is typical of contemporary multicast deployments, which have very localized sources with large user (receiver) fan-out, regionally or globally.

In this scenario and for this particular multicast group, group state is no longer relevant. Any set of receivers' interest is relevant only to the source of the multicast content. The outgoing interface (OIF) list in the multicast forwarding entry may be bound to the source address (i.e., the S term in the multicast forwarding state as described above) instead of to the group address (i.e., the G term in the multicast forwarding state as described above). Once the OIF list (also known as the OIL or olist) is bound to the source address, the multicast forwarding state may be aggregated. For some embodiments, the multicast forwarding state may be aggregated based on matching OIF and incoming interface (IIF). In other words, the multicast forwarding state may be aggregated based on matching outgoing and incoming interface information in the multicast forwarding entry.

For some embodiments, aggregated forwarding state(s) may be further aggregated based on matching source address prefixes on power-of-2 boundaries, creating "S/n" multicast forwarding entries. The "n" in this prefix notation indicates the number of significant bits in the source address "S" that match. As used herein, a boundary (also known as a "bit boundary") in the source address generally refers to the bit position in the source address that marks the dividing point between bit values that are always the same (the "prefix") and bit values that will vary. For example, since a source address is an IP address with 32 bits, S/28 indicates that the first 28 bits of the source addresses in the aggregated forwarding state are all the same, but the last 4 bits may be different. If the source addresses in an aggregated forwarding state are sequential and fill a power-of-2 boundary, the aggregated forwarding state may be represented by the S/n prefix instead, thereby reducing the number of bits used to store the forwarding state (i.e., from 32 bits down to n bits for a particular aggregated forwarding state). Having several multicast sources with sequential source addresses often occurs in a data center used to support a massively deployed application.

In this manner, the amount of forwarding state may be reduced, especially in a massively deployed application with many sources. For some embodiments, this SRM capability (i.e., multicast forwarding state aggregation) may be node-specific for reducing forwarding state, yet maintain Protocol Independent Multicast Source Specific Multicast (PIM-SSM) interoperability.

Since the OIF list is bound to the source address, the resulting forwarding state may be referred to as a "source state." In this case, the result of aggregating the source state may be known as aggregated source states, rather than aggregated forwarding states. The two terms may be used interchangeably.

Figure 2:
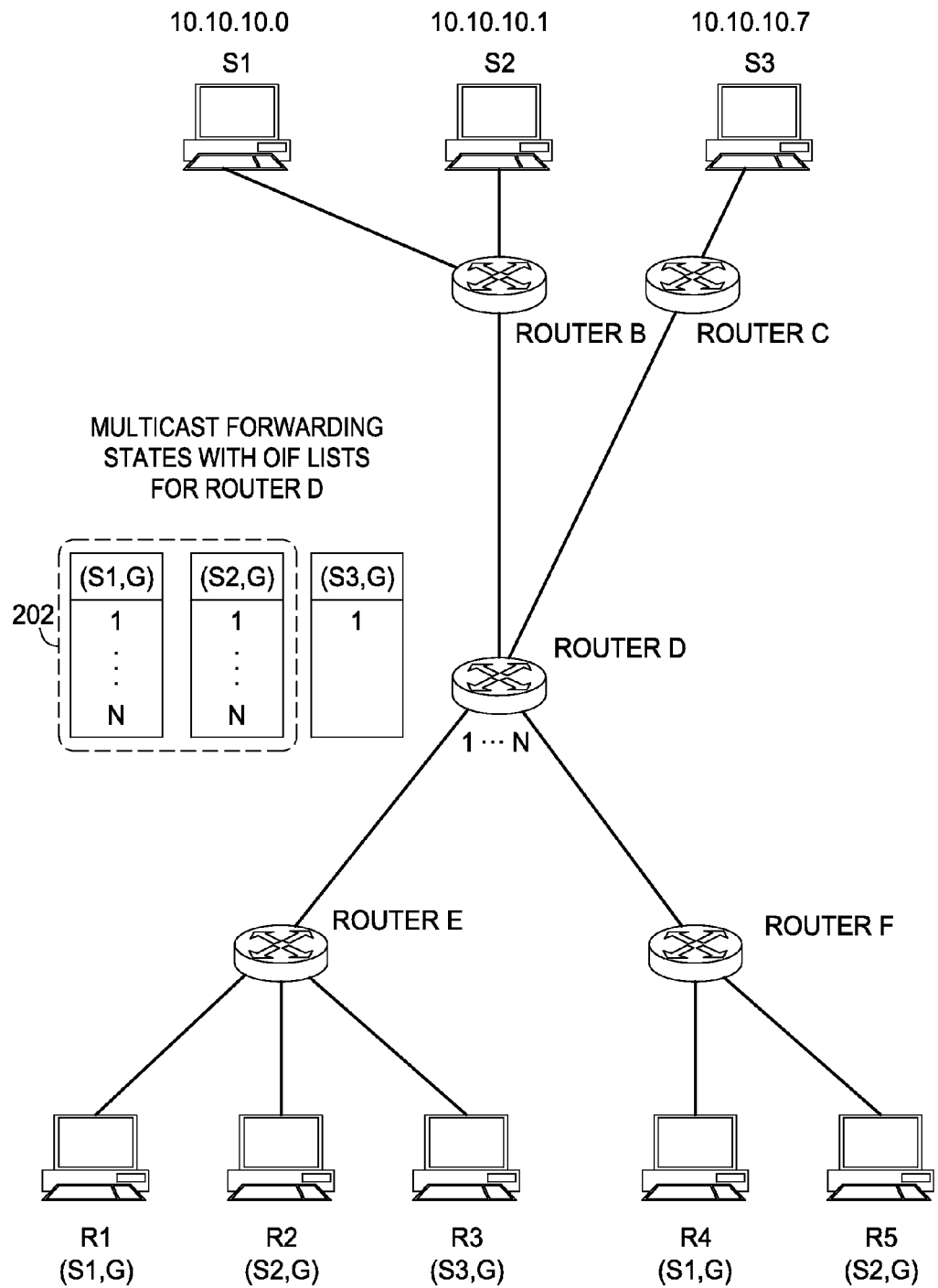
FIG. 2 illustrates an example topology for source-rooted multicast (SRM) with aggregated forwarding states, in accordance with an embodiment of the present disclosure.

FIG. 2 illustrates an example topology for SRM with aggregated forwarding states, in accordance with an embodiment of the present disclosure. Although FIG. 2 illustrates three multicast sources S1, S2, and S3 and five multicast receivers R1-R5 as an example, the number of sources and/or receivers may be increased or decreased without departing from the scope of this disclosure. Furthermore, network nodes may be added to or removed from the network topology illustrated in FIG. 2. As shown in FIG. 2, source S1 and source S2 are connected with core router D via edge router B. Similarly, source S3 is connected with core router D via edge router C.

Core router D has N logical outgoing interfaces. Receivers R1, R2, and R3 are connected with a router port associated with logical outgoing interface 1 of core router D via edge router E. Receivers R4 and R5 are connected with a router port associated with logical outgoing interface N of core router D via edge router F. Although not shown for ease of understanding and illustration, any or none of logical outgoing interfaces 2 through N−1 of core router D may be connected with any of receivers R1-R5 and/or to other receivers (not shown).

For the example of FIG. 2, assume that receivers R1 and R4 have previously requested to receive multicast data for group G from source S1. Also, receivers R2 and R5 have previously requested to receive multicast data for the same group G from source S2, and receiver R3 has previously requested to receive multicast data for the same group G from source S3. Since core router D has been informed of three different multicast forwarding states for the three different multicast sources S1, S2, and S3 via reverse path forwarding (RPF), core router D may maintain three different OIF lists as shown, one for each of the three different multicast forwarding states: (S1,G), (S2,G), and (S3,G). In addition, since core router D has determined via RPF that traffic from sources S1 and S2 arrives via the same IIF (indicating a port on core router D connected with another port on router B), the multicast forwarding states (S1,G) and (S2,G) also share the same IIF.

In conventional multicast, the OIF list associated with each multicast forwarding state is bound to the group address. With SRM, as described above, the OIF list is bound to the source address instead of to the group address. Therefore, the multicast forwarding states may be aggregated to form aggregated source states (i.e., aggregated forwarding states), thereby reducing the amount of forwarding state (i.e., the number of stored forwarding state entries). For some embodiments, the multicast forwarding states may be aggregated based on matching OIFs and IIFs, for example. In the example of FIG. 2, the forwarding entries for (S1,G) and (S2,G) have matching OIF lists and a matching IIF, so an aggregated source state 202 may be formed as shown. The OIF list for (S3,G) is different than the OIF lists for (S1,G) and (S2,G), so an aggregated source state is not formed with (S3,G).

With the aggregated source state 202, the number of multicast forwarding states has been reduced from three to two. Although only two multicast forwarding states are aggregated in the example of FIG. 2 to form a single aggregated source state, any number of multicast forwarding states with matching characteristics may be aggregated. Multicast packets may be forwarded according to the aggregated source state 202. Multicast content providers and large scale multicast application service providers may use SRM to reduce forwarding state within their multicast routers.

For some embodiments, an aggregated forwarding state may be further aggregated based on a matching source prefix on a power-of-2 boundary. For example, suppose source S1 has a source address of 10.10.10.0 and source S2 has a source address of 10.10.10.1 as shown in FIG. 2. In this case, these two source addresses are sequential and fill a power-of-2 boundary at bit 31 (i.e., these two source addresses match on the first 31 bits and only vary in the last bit). Therefore, an S/31 multicast forwarding entry (i.e., the 31-bit prefix) may be created for the aggregated forwarding state 202, rather than using the 32-bit source address. This further aggregation according to matching source address prefix may further reduce the amount of forwarding state maintained by a network node, especially in scenarios where several multicast sources with sequential source addresses fill a power-of-2 boundary and also have forwarding states with matching OIF and IIF.

Example PIM Join State
Aggregation/De-Aggregation for SRM

Although SRM as described above may reduce the amount of forwarding state, Protocol Independent Multicast (PIM) may still entail a list of sources per group in join or prune messages. Routers use PIM join and prune messages to join and leave, respectively, multicast distribution trees. This protocol is termed "protocol independent" because PIM is not dependent on any particular unicast routing protocol for network topology discovery. Embodiments of the present disclosure expand on the aggregated source state concept of SRM by reducing PIM join/prune state processing for SRM nodes while maintaining compatibility with non-SRM PIM routers.

SRM-capable network nodes may enhance PIM join/prune processing by changing the PIM join/prune message from a list of sources to a S/n per group list instead, where "S/n" indicates the source address prefix as described above. This may allow an SRM-capable node to send a single upstream join message for a large number of sources for a single SRM group when the OIF list and reverse path forwarding (RPF) neighbor are the same. In cases where a single SRM forwarding entry has upstream neighbor divergence, joins/prunes may be split along RPF neighbors. For some embodiments, PIM neighbors may signal SRM capability via a PIM "Hello" message. PIM Hello messages are typically used for detecting other PIM neighbors. When an upstream neighbor is an SRM-capable neighbor, PIM join/prune messages with S/n per group list may be sent. In this manner, PIM join/prune processing may be significantly reduced in massive multicast deployments and applications which use SRM. When an upstream neighbor is not an SRM neighbor, standard PIM join/prune messages may be sent.

Figure 3:
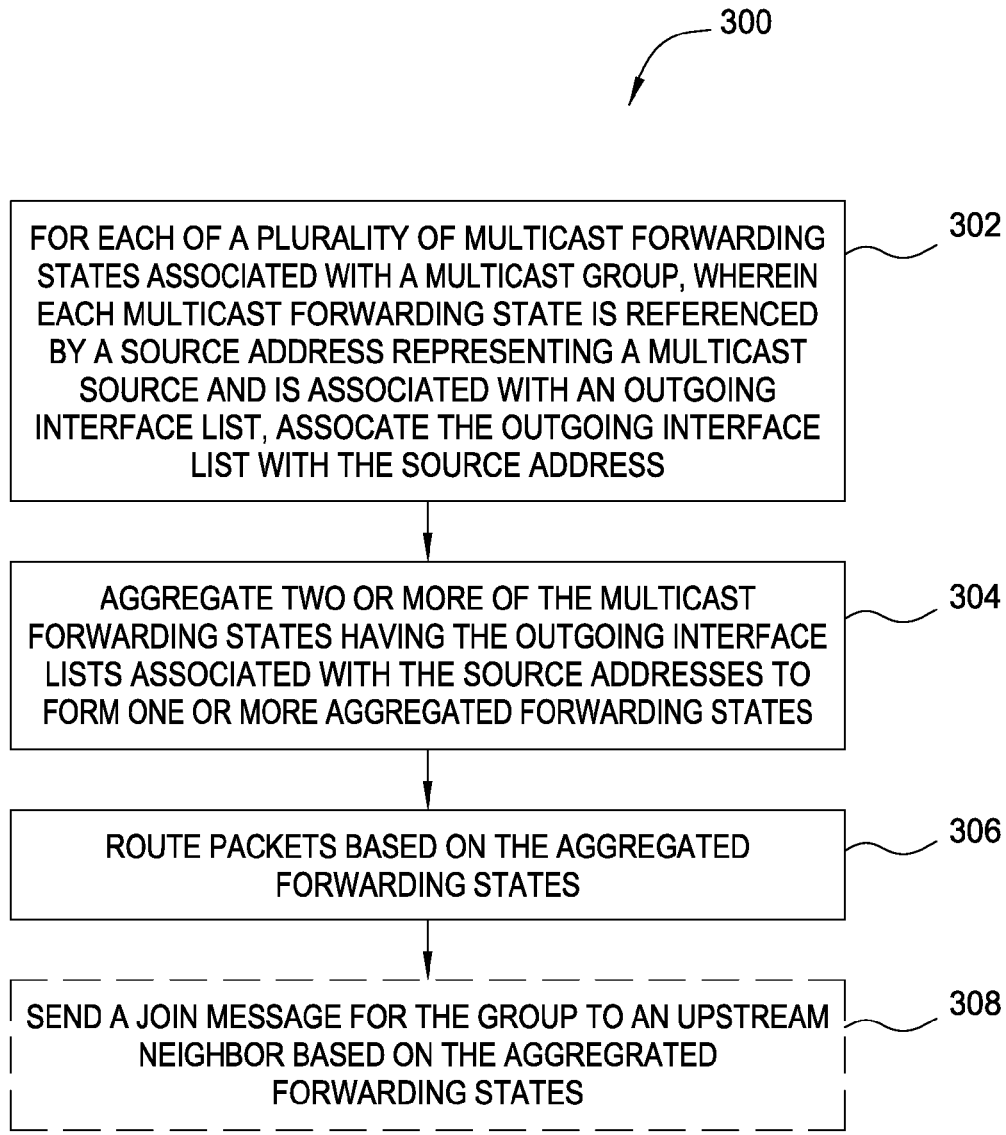
FIG. 3 is a flow diagram of example operations for forming and using aggregated forwarding states, in accordance with an embodiment of the present disclosure.

FIG. 3 is a flow diagram of example operations 300 for forming and using aggregated forwarding states, in accordance with an embodiment of the present disclosure. The operations 300 may be performed by a network node, especially a core node, such as the core router D of FIG. 2.

The operations 300 may begin at 302. For each of a plurality of multicast forwarding states associated with a multicast group, the network node may associate an outgoing interface list with a source address at 302. Each multicast forwarding state in this plurality is referenced by a source address and is associated with an outgoing interface list. Each source address represents a different multicast source, such as sources S1, S2, and S3 in FIG. 2. For some embodiments, each multicast forwarding state may include an outgoing interface list.

At 304, the network node may aggregate two or more of the multicast forwarding states having the outgoing interface lists associated with the source addresses (at 302). Doing so creates aggregated forwarding states, where the number of aggregated forwarding states is less than or equal to the number of multicast forwarding states. In this manner, the amount of forwarding state stored by the network node is reduced, thereby saving resources, especially in very large multicast deployments. At 306, the node may route packets (i.e., forward traffic) based on the aggregated forwarding states. For example, when a packet sent in a multicast stream by a multicast source (whose source address is associated with an aggregated forwarding state) reaches the node, the node uses the OIF list of the aggregated forwarding state to determine the logical outgoing interface from which to forward the received packet.

For some embodiments, the network node may send a join message for the group to an upstream neighbor at 308, based on the aggregated forwarding states. In this case, the node may receive a message indicating that the neighbor supports aggregated forwarding states, as described above.

For some embodiments, the network node may aggregate the multicast forwarding states at 304 based on matching outgoing interfaces (OIFs) and matching incoming interfaces (IIFs). For some embodiments, the network node may further aggregate at least one of the aggregated forwarding states at 304 based on a matching source address prefix on a power-of-2 boundary. For some embodiments, the aggregated forwarding states are compatible with Protocol Independent Multicast Source Specific Multicast (PIM-SSM).

CONCLUSION

Although SSM forwarding trees use both source and group addresses for distinguishing trees from one another, in practice, it is often only the source address that is the distinguishing parameter for any given group (or N groups from any source). A multicast application with many sources within a small number of data centers and with many receivers each could all use the same group address, thereby allowing PIM routers in the path to aggregate forwarding state to just OIFs per source address. For some embodiments, the PIM routers may aggregate further based on power-of-2 boundaries creating S/n multicast forwarding entries, thereby radically reducing forwarding state in very large multicast deployments.

For some embodiments, SRM-capable nodes may enhance PIM join/prune processing by changing the PIM join/prune message from a list of sources to an S/n per group list instead. This may entail using a PIM Hello message with which PIM neighbors may signal SRM capability.

As will be appreciated by one skilled in the art, embodiments may be embodied as a system, method, or computer program product. Accordingly, aspects may take the form of an entirely hardware embodiment, an entirely software embodiment (including firmware, resident software, microcode, etc.), or an embodiment combining software and hardware aspects that may all generally be referred to herein as a "circuit," "module," or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The flowchart and block diagrams in the figures illustrate the architecture, functionality and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

The invention claimed is:

1. A method, comprising:
for each of a plurality of multicast forwarding states associated with a multicast group, wherein each multicast forwarding state is referenced by a multicast source address and is associated with an outgoing interface list, associating the outgoing interface list with the source address;
aggregating two or more of the multicast forwarding states having the outgoing interface lists associated with the source addresses to form one or more aggregated forwarding states;
sending a join message for the multicast group to an upstream neighbor based on the aggregated forwarding states; and
receiving a message indicating that the upstream neighbor supports aggregated forwarding states.

2. The method of claim 1, wherein the number of aggregated forwarding states is less than or equal to the number of multicast forwarding states.

3. The method of claim 1, further comprising, routing packets based on the aggregated forwarding states.

4. The method of claim 1, wherein the aggregating comprises aggregating the multicast forwarding states based on matching outgoing interfaces (OIFs) and incoming interfaces (IIFs).

5. The method of claim 4, wherein the aggregating comprises further aggregating at least one of the aggregated forwarding states based on a source address prefix on a power-of-2 boundary.

6. The method of claim 1, wherein the aggregated forwarding states are compatible with Protocol Independent Multicast Source Specific Multicast (PIM-SSM).

7. An apparatus comprising:
at least one processing unit configured to:
associate—for each of a plurality of multicast forwarding states associated with a multicast group, wherein each multicast forwarding state is referenced by a multicast source address and is associated with an outgoing interface list—the outgoing interface list with the source address;
aggregate two or more of the multicast forwarding states having the outgoing interface lists associated with the source addresses to form one or more aggregated forwarding states;
send a join message for the multicast group to an upstream neighbor based on the aggregated forwarding states; and
receive a message indicating that the upstream neighbor supports aggregated forwarding states.

8. The apparatus of claim 7, wherein the at least one processing unit is further configured to route packets based on the aggregated forwarding states.

9. The apparatus of claim 7, wherein the at least one processing unit is configured to aggregate the multicast forwarding states based on matching outgoing interfaces (OIFs) and incoming interfaces (IIFs).

10. The apparatus of claim 9, wherein the at least one processing unit is configured to further aggregate at least one of the aggregated forwarding states based on a source address prefix on a power-of-2 boundary.

11. The apparatus of claim 7, wherein the aggregated forwarding states are compatible with Protocol Independent Multicast Source Specific Multicast (PIM-SSM).

12. An apparatus comprising:
means for associating—for each of a plurality of multicast forwarding states associated with a multicast group, wherein each multicast forwarding state is referenced by a source address representing a multicast source and is associated with an outgoing interface list—the outgoing interface list with the source address;
means for aggregating two or more of the multicast forwarding states having the outgoing interface lists associated with the source addresses to form one or more aggregated forwarding states;
means for sending a join message for the multicast group to an upstream neighbor based on the aggregated forwarding states; and
means for receiving a message indicating that the upstream neighbor supports aggregated forwarding states.

13. The apparatus of claim 12, further comprising means for routing packets based on the aggregated forwarding states.

14. The apparatus of claim 12, wherein the means for aggregating is configured to aggregate the multicast forwarding states based on matching outgoing interfaces (OIFs) and incoming interfaces (IIFs).

15. The apparatus of claim 14, wherein the means for aggregating is configured to further aggregate at least one of the aggregated forwarding states based on a source address prefix on a power-of-2 boundary.

16. The apparatus of claim 12, wherein the aggregated forwarding states are compatible with Protocol Independent Multicast Source Specific Multicast (PIM-SSM).

17. A method, comprising:
for each of a plurality of multicast forwarding states associated with a multicast group, wherein each multicast forwarding state is referenced by a multicast source address and is associated with an outgoing interface list, associating the outgoing interface list with the source address;
aggregating, based on matching outgoing interfaces (OIFs) and incoming interfaces (IIFs), two or more of the multicast forwarding states having the outgoing interface lists associated with the source addresses, to form one or more aggregated forwarding states; and
further aggregating at least one of the aggregated forwarding states based on a source address prefix on a power-of-2 boundary.

18. The method of claim 17, wherein the number of aggregated forwarding states is less than or equal to the number of multicast forwarding states.

19. An apparatus comprising:
at least one processing unit configured to:
associate—for each of a plurality of multicast forwarding states associated with a multicast group, wherein each multicast forwarding state is referenced by a multicast source address and is associated with an outgoing interface list—the outgoing interface list with the source address;
aggregate, based on matching outgoing interfaces (OIFs) and incoming interfaces (IIFs), two or more of the multicast forwarding states having the outgoing interface lists associated with the source addresses, to form one or more aggregated forwarding states; and
further aggregate at least one of the aggregated forwarding states based on a source address prefix on a power-of-2 boundary.

20. The apparatus of claim 19, wherein the at least one processing unit is further configured to route packets based on the aggregated forwarding states.

* * * * *